Sept. 16, 1941.  E. GRAY  2,256,113
CLOSURE CAP FOR BOTTLES, JARS, AND THE LIKE CONTAINERS
Filed July 6, 1939
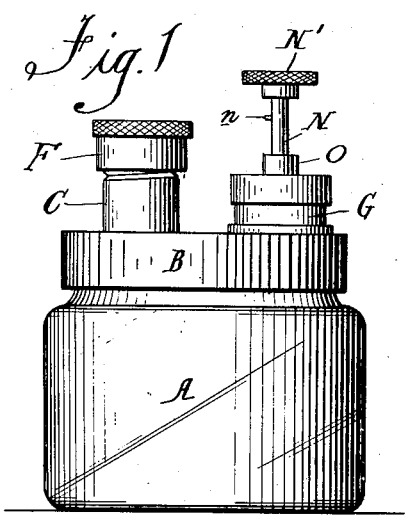
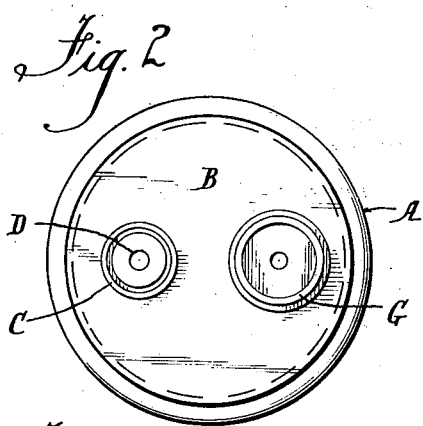
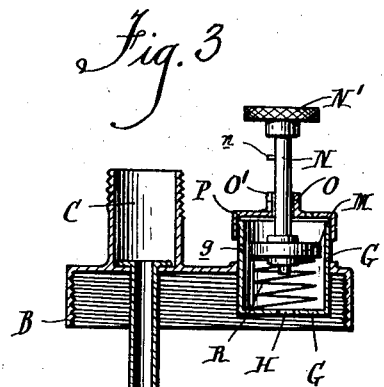
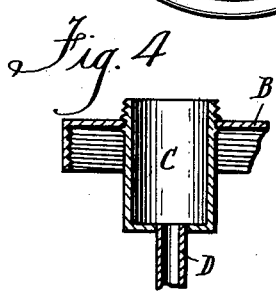
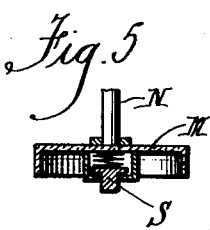
INVENTOR
EUSTACE GRAY
BY Young, Emery &Thompson
ATTYS.

Patented Sept. 16, 1941

2,256,113

UNITED STATES PATENT OFFICE 2,256,113

CLOSURE CAP FOR BOTTLES, JARS, AND THE LIKE CONTAINERS

Eustace Gray, Auckland, New Zealand

Application July 6, 1939, Serial No. 283,090
In New Zealand September 15, 1938

3 Claims. (Cl. 221—147)

This invention relates to improvements in caps for covering the tops of bottles, jars and the like, containing liquid bodies, the purpose being to not only seal the container, but to provide that by the simple manipulation of a fitting incorporated in the cap, a cavity or reservoir situated therein is charged with a quantity of liquid from the container to which it is fitted, such charging of the reservoir being effected regardless of the quantity of liquid in the container.

The invention in its use makes provision for the cleanly, ready and ample supply of a quantity of the liquid contents of a bottle or other container, in circumstances such that this supply may be used to meet requirements of various kinds. For instance, the invention may be applied to the closure cap of an ink bottle to afford facilities for the filling of fountain pens; to the closure caps of bottles containing artist's colours, liquid gums and the like, to afford facility for the wetting of brushes with the liquid concerned: to the closure caps of hypodermic injection containing bottles, to afford facility for the filling of the syringe, and in a great number of other circumstances where it is required as in those referred to, to provide a supply of the liquid of sufficient depth and quantity to fulfil the requirements, no matter what depth is contained within the bottle or container itself.

According hereto the invention comprises improvements in that class of means in which there are combined with a closure cap adapted to make an airtight seal upon the container, an open reservoir chamber or well positioned on the upper side of the cap and communicating with the interior of the container by means of a tube leading from the bottom of the chamber down to within a short distance of the bottom of the container, and means whereby the air in the container may be compressed to thereby cause a displacement of the container's liquid contents up the tube and into the reservoir chamber or well.

In this invention the means for thus causing the displacement of liquid into the reservoir or well consist in a plunger device fitted within a cylinder extending up from the container cap, which plunger device is adapted to be forced down in the cylinder to compress the air in the container, or be drawn upwardly to remove the compression, and thus cause the liquid to move upward into the reservoir or well, or to drain back therefrom into the container and the plunger is provided with means for sealing the lower end of the cylinder.

In fully describing the invention, reference will be made to the accompanying sheet of drawings, in which:

Figure 1 is an elevation of a container having the invention combined therewith.

Figure 2 is a plan thereof.

Figure 3 is a vertical sectional view of Fig. 1 showing the plunger.

Figure 4 is a detail view showing an alternative manner of attaching the reservoir or well to the cap.

Figure 5 is an enlarged detail sectional elevation of the plunger shown in Figure 3.

A is a container of any desired form and capacity. B is the cap closure for covering the container and this is designed to make an air tight sealing of the container, as by screwing thereon in the manner shown in the drawing. An open topped circular reservoir or well C is combined with the cap, as by being fitted in the cap top. From the bottom end of the reservoir or well C a tube D opens downwards and this tube extends to within a short distance from the bottom of the container. The tube D may be made of rubber or other similar material and may be so fitted to the reservoir or well bottom as to be adaptable for removal and replacement whenever required.

A screw-on lid or cover F (Figure 1) may be provided for covering and sealing the upper end of the reservoir or well.

Also fitted into the top of the cap B is a cylinder G opening at its bottom through such cap, or being carried a distance in through the cap as in Figure 3 and then formed with an air opening H in its inner end.

It will be apparent that with the container charged with liquid to any depth at which the lower end of the tube D is covered, and filled with air above the liquid, an inward movement of the plunger J will cause a compression of air which will act to force a supply of liquid up through the tube D and into the reservoir or well C to a depth therein depending upon the amount of inward movement given the plunger. On the plunger being drawn outward, the liquid will drain back into the container. Should the liquid in the container be decreased in quantity such as to rarefy the air in the container to the extent of preventing the plunger performing its function, the complete withdrawal of the plunger will allow of the air supply being restored to its normal pressure.

As shown in Figures 3 and 5, a disc plunger

M is fitted in the cylinder and is attached to a push rod or stem N that extends out through a guide O in a cover plate P provided to fit upon and close the cylinder top. A push button N' is fixed on the top end of the rod or stem N. A helical spring R, in compression, is contained in the cylinder bottom between the plunger and such bottom and this serves to normally force the plunger outward. In its outward position the plunger uncovers an air aperture g in the cylinder wall so that air may enter the container A to keep it supplied. The lowering of the plunger will shut off the air aperture g and will cause the compression of air in the container required to raise the liquid level in the reservoir or well in the manner before described.

The said plunger may be fitted with a spring cushioned press stud S in its lower side, see Figure 5, and this when the plunger is pressed down, will seat itself upon the opening H in the cylinder bottom, to seal it against entry of air, or escape of liquid. The plunger is retained in its lowered position by providing the upper end of its rod or stem N with a radial pin n which, when lowered, may be caused to engage and lock within a bayonet joint slot O' formed in the guide O.

I claim:

1. A closure cap for bottles, jars or like containers for liquids, constructed to make an airtight seal upon such containers comprising a well in the top of the cap, a tube opening and extending from the bottom of such well into the container, a cylinder extending inwardly from said cap, said cylinder having a closed inner end with an aperture therein, a cover on the outer end of said cylinder, a plunger slidable in the cylinder, a stem on said plunger extending through the cover, a spring urging said plunger towards said cover, means at the inner face of said plunger adapted to seal the aperture in the inner end of the cylinder when the plunger is adjacent said end, and means for locking the stem and plunger in such aperture sealing position.

2. A closure cap according to claim 1 in which the aperture sealing means is a spring press stud on the inner face of the plunger.

3. A closure cap according to claim 1 in which the locking means includes a pin radiating from the stem and a bayonet joint slot in the cover into which such pin is adapted to enter and lock.

EUSTACE GRAY.